United States Patent
Patel et al.

(10) Patent No.: US 10,447,622 B2
(45) Date of Patent: Oct. 15, 2019

(54) IDENTIFYING TRENDING ISSUES IN ORGANIZATIONAL MESSAGING

(71) Applicant: AT&T Intellectual Property I, L.P.

(72) Inventors: Rujuta Patel, Old Bridge, NJ (US); Anamaria Csupor, Holmdel, NJ (US); Monowar Hossain, Middletown, NJ (US); Thomas Tam, Old Bridge, NJ (US); Thomas Wirtz, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 328 days.

(21) Appl. No.: 14/706,677

(22) Filed: May 7, 2015

(65) Prior Publication Data

US 2016/0330145 A1 Nov. 10, 2016

(51) Int. Cl.
*H04L 12/58* (2006.01)
*G06Q 30/00* (2012.01)

(52) U.S. Cl.
CPC .......... *H04L 51/04* (2013.01); *G06Q 30/016* (2013.01); *H04L 51/16* (2013.01)

(58) Field of Classification Search
USPC ...................................................... 709/206
See application file for complete search history.

(56) References Cited

U.S. PATENT DOCUMENTS

| | | | |
|---|---|---|---|
| 7,593,904 B1 * | 9/2009 | Kirshenbaum | G06Q 10/10 706/12 |
| 7,856,469 B2 | 12/2010 | Chen et al. | |
| 8,649,499 B1 * | 2/2014 | Koster | H04M 3/5175 379/265.06 |
| 8,843,835 B1 | 9/2014 | Busey et al. | |
| 2004/0083213 A1 * | 4/2004 | Wu | G06F 17/3064 |
| 2005/0216269 A1 * | 9/2005 | Scahill | G06F 17/30663 704/270.1 |
| 2009/0313334 A1 | 12/2009 | Seacat et al. | |
| 2011/0033036 A1 * | 2/2011 | Edwards | G06Q 30/02 379/265.09 |
| 2011/0258017 A1 | 10/2011 | Koppula et al. | |
| 2012/0130771 A1 | 5/2012 | Kannan et al. | |
| 2012/0265806 A1 | 10/2012 | Blanchflower et al. | |
| 2013/0144682 A1 | 6/2013 | Dhara et al. | |
| 2013/0262168 A1 * | 10/2013 | Makanawala | H04L 51/32 705/7.14 |

(Continued)

OTHER PUBLICATIONS

Cooper, Steve, "The Ultimate Guide to Hosting a Tweet Chat", http://www.forbes.com/sites/stevecooper/2013/09/30/the-ultimate-guide-to-hosting-a-tweet-chat/, Sep. 30, 2013, pp. 1-4.

(Continued)

*Primary Examiner* — Chris Parry
*Assistant Examiner* — Caroline H Jahnige (57) ABSTRACT

A method may include receiving a chat conversation between a first user and second user pertaining to a customer service issue, determining a tagged term associated with the chat conversation based upon a tag indicator, and determining whether the tagged term relates to an existing tagged term in a set of tagged terms. When the tagged term relates to the existing tagged term, the chat conversation may be associated with the existing tagged term and a counter incremented for the existing tagged term. The method may then present a subset of the set of tagged terms.

20 Claims, 5 Drawing Sheets

(56) References Cited

U.S. PATENT DOCUMENTS

| | | | |
|---|---|---|---|
| 2014/0012626 A1 | 1/2014 | Ajmera et al. | |
| 2014/0013249 A1 | 1/2014 | Moeinifar et al. | |
| 2014/0040387 A1 | 2/2014 | Spivack Nova et al. | |
| 2014/0229408 A1* | 8/2014 | Vijayaraghavan | G06N 99/005 706/12 |
| 2014/0278367 A1 | 9/2014 | Markman et al. | |
| 2014/0289231 A1 | 9/2014 | Palmert | |
| 2014/0324982 A1 | 10/2014 | Agrawal et al. | |
| 2015/0081725 A1 | 3/2015 | Ogawa et al. | |
| 2016/0021038 A1* | 1/2016 | Woo | H04L 51/046 709/206 |
| 2016/0026962 A1* | 1/2016 | Shankar | G06Q 10/06398 705/7.42 |

OTHER PUBLICATIONS

Frasco, Stephanie, "Twitter Chats and Hashtags: 5 Strategic Ways to Increase Twitter Engagement", http://www.socialmediatoday.com/content/twitter-chats-and-hashtags-5-strategic-ways-increase-twitter-engagement, Mar. 29, 2013, pp. 1-11.

Grinberg, Ben, "Track customer conversations with chat & ticket tagging", http://blog.livehelpnow.net/track-customer-conversations-with-chat-ticket-tagging/, Dec. 28, 2012, pp. 1-5.

Firuta, Jacob, "Tagging chats and tickets", http://www.livechatinc.com/kb/tagging-chats-and-tickets/, downloaded Mar. 20, 2015, pp. 1-7.

\* cited by examiner

IDENTIFYING TRENDING ISSUES IN ORGANIZATIONAL MESSAGING

The present disclosure relates generally to processing of messages, e.g., in the context of providing customer service troubleshooting and, more particularly, for associating chat conversations with tagged terms and/or for associating sets of procedural instructions with the tagged terms.

BACKGROUND

Various types of organizations provide customer service agents for handling a variety of customer-facing issues. For example, a network service provider may staff a call center with customer service agents for handling issues relating to billing, service disruption, service degradation, adding and removing features from service plans, endpoint device troubleshooting, and so forth. In some cases, customers may contact the organization by telephone at a call center. In other cases, an organization may provide customer service agents who are available for network-based chat conversations, e.g., instant messages, text messages, emails and so forth.

SUMMARY

In one example, the present disclosure provides a method, computer readable medium, and device for associating a chat conversation with a tagged term. For example, a method may include a processor receiving a chat conversation between a first user and a second user, determining a tagged term associated with the chat conversation, and determining whether the tagged term in the chat conversation relates to an existing tagged term in a set of tagged terms. In one example, the chat conversation pertains to a customer service issue. In one example, the tagged term is determined based upon a tag indicator in the chat conversation. When the tagged term in the chat conversation relates to the existing tagged term, the processor may associate the chat conversation with the existing tagged term and increment a counter for the existing tagged term. The processor may further present at least a subset of the set of tagged terms.

In one example, the present disclosure further provides a method, computer readable medium, and device for associating a set of procedural instructions with a tagged term. For example, a method may include a processor presenting at least a subset of a set of tagged terms based upon a respective counter value of each of the at least the subset of the set of tagged terms, receiving, from an administrator device, a selection of one of the tagged terms from the subset of the set of tagged terms, receiving, from the administrator device, a set of procedural instructions for resolving a customer service issue that is associated with the one of the tagged terms, and associating the set of procedural instructions with the one of the tagged terms. In one example, the list of tagged terms comprises tagged terms that have been used in chat conversations pertaining to one or more customer service issues. The method may further include the processor receiving an additional selection of the one of the tagged terms, wherein the additional selection is received from a device of a customer service representative and presenting, to the device of the customer service representative, the set of procedural instructions for resolving the customer service issue.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer readable storage media, and devices for associating messages, e.g., chat conversations with tagged terms and/or for associating sets of procedural instructions with the tagged terms. For example, the present disclosure enables chat users to tag terms that are used during chat conversations relating to customer service issues. The chat users may comprise customers, customer service representatives, or other organizational representatives engaging in chat conversations relating to a customer service issue. Tagged terms, e.g., words (broadly alpha numeric characters), phrases or subset of phrases, that are most popular or trending are presented for other chat users (e.g., organizational representatives) to see during chat conversations. Other chat users can then select and reuse one or multiple tagged terms that have emerged to tag a new chat conversation. In addition, managers can create and publish advisories and M&Ps (methods and procedures) based on trending terms to minimize the need to initiate new chat conversations. Chat users can select trending terms to see relevant advisories and M&Ps to determine if there is still a need to begin or continue with a chat conversation. As such, the present disclosure surfaces trending terms to drive faster resolutions of customer service issues, improve operational efficiency, improve customer satisfaction, reduce work center staffing needs for chat conversation support, and promote more effective collaboration among all organizational representatives.

To illustrate, customers may call via a telephone or engage in chat conversations with customer service representatives of an organization, e.g., a telecommunication service provider. A chat conversation may comprise a series of one or more messages sent between devices of at least two users. In one example, the chat conversations may comprise text-based messages. However, in one example, the text-based messages may include photographs, video, or other multi-media, links, hypertext, executable code or applications, and so forth. In one example, the messages of the chat conversations may be limited to a particular size, e.g., 140 characters or less. However, the present disclosure is not limited to chat conversations that utilize messages of any particular size or that may have a maximum size. The chat conversations may relate to various customer service issues such as: billing inquiries, questions regarding television, phone or Internet services, equipment troubleshooting, equipment upgrades, service disruption, service degradation, and so forth.

In addition, customer service representatives and/or other employees or agents of the organization (broadly "organizational representatives") may engage in chat conversations relating to customer service issues. For example, a customer service representative may field an inquiry from a customer, via a telephone or via a chat conversation, regarding a service outage in a particular service area. The customer service representative may then engage in a chat conversation with a service technician to inquire if the service technician is aware of any issues that may impact service in the area. In another example, the customer service representative may be aware of an issue impacting the service in the area, and may also be aware that service technicians are working to fix the problem. Therefore, the customer service representative may engage in chat conversation with a service technician to inquire as to the status of the problem.

In another example, two service technicians may engage in a chat conversation to discuss a customer-facing issue. For instance, the two service technicians may be working on a problem that is affecting many customers who have made customer service calls or engaged in other chat conversations with customer service representatives. For example, the service technicians may be working on different aspects of troubleshoot a routing issue, or other service issues, and may converse via the chat conversation in order to discuss the respective progress that has been made by each service technician, or to ask questions or obtain help regarding the task to be performed by each service technician. It should be noted that in some cases, chat conversations of the present disclosure may include interactive (e.g., broadly comprising dynamic real time interaction) chat conversations between just two participants. This is in contrast to other messaging platforms that may provide for tagging of terms, but which generally relate to broadcast messages or one-to-many messages.

In one example, one of the participants in a chat conversation, whether it be a customer/subscriber, a customer service representative, a service technician, or another employee or agent performing tasks related to customer service issues, may tag a term in the chat conversation using a particular tag indicator, or tag that identifies a term that should be associated with the chat conversation. For example, a hashtag or another tag identifier may indicate that a following term, a preceding term, a term contained between tags, and so forth should be identified with the chat conversation. For example, a hashtag followed by the term "service outage" may indicate that the chat conversation should be related with a service outage concept. A hashtag followed by the term "November billing" may indicate that the chat conversation should be related with a "November billing" issue. For instance, an increased bill relating to a new tax instituted by a state governmental agency may be a common issue that is affecting many subscribers in the particular state during the particular month of November.

Each chat conversation may comprise one or more messages between the devices of participants of the chat conversation. In addition, one or more of the participants may tag any one or more terms within one or several messages of the chat conversation. For example, one of the participants may tag the term "service outage" in one of the messages of the chat conversation. In addition, the same or another participant may also tag the term "77777," e.g., a zip code of the customer calling about the service outage. Thus, a chat conversation may be associated with one term, or a plurality of different terms that have been tagged.

In one example, chat conversations may continue until a particular customer service issue is resolved. In one example, chat conversations are stored and made available for searching and review by others who were not participants in the original chat conversation. For example, a customer service representative may engage in a chat conversation with a customer to help resolve a billing issue raised by the customer. In addition, a second customer may engage in a chat conversation with a second customer service representative regarding the same or a similar billing issue. In one example, the second customer service representative may review the previous chat conversation and choose to follow the same or similar procedures for resolving the billing issue that were utilized in the earlier chat conversation.

In one example, a chat conversation interface may include a window with sent messages, a window with received messages, and a window with terms that can be selected. For example, each term may comprise a term that has been tagged in at least one previous chat conversation, where if a user clicks on the term, one or more stored chat conversations associated with the term may be retrieved and presented to the user for review. In one example, the terms presented comprise at least a subset of a set of terms that are prioritized based upon a number of chat conversations that referenced the term, e.g., those chat conversations in which the term has been tagged. For example, the at least subset of terms may be presented in an order of most tagged term to least tagged term. In one example, the at least subset of tagged terms is presented as a list, e.g., the top 20 terms, or other number of terms, out of a larger number of terms that has been tagged in chat conversations. In one example, the terms that are presented are prioritized in a different manner. For example, the terms with the greatest number of tags may be presented in a larger font size, a bold font, a different color, a blinking text, and so forth.

In one example, an organizational representative, e.g., a customer service representative, or other employees or agents of the organization who engage in customer service related tasks, may utilize an endpoint device with a chat conversation interface. The organizational representative may engage in chat conversations with a customer or other organizational representatives related to the customer service issue. However, the organizational representative may first look to at least the subset of terms to see if any terms are relevant to the current issue faced by the organizational representative. Therefore, the organizational representative may click on one or more of the terms, have one or more stored chat conversations presented, review the one or more stored chat conversations, and utilize any procedures found in the stored chat conversations that the organizational representative finds to be relevant. In another example, the organizational representative may engage in a chat conversation with a customer or other organizational representatives prior to determining an issue that is presented. Therefore, the organizational representative may, in the middle of a current chat conversation, select one or more terms, and retrieve and review one or more stored chat conversations associated with the one or more terms. The organizational representative may then utilize in the current chat conversation any procedures found in the stored chat conversations that the organizational representative finds to be relevant.

In one example, during a current chat conversation, an organizational representative may reference a previous stored chat conversation. For example, the organizational representative may be a first service technician that is engaged in a chat conversation with a second service technician. The second service technician may be addressing a problem that the first service technician has previously worked on, or which the first service technician is aware of an existing solution. As such, the first service technician may reference a previously stored chat conversation in a message to the second service technician within the current chat conversation. For instance, the first service technician may insert a link or otherwise provide a direction to the second service technician to retrieve a stored chat conversation that may include a solution to the problem, or information that the first service technician considers to be helpful in finding a solution. In one example, the present disclosure counts and tracks the number of times a chat conversation is referenced by other chat conversations. For example, the most cited chat conversations may be considered to be more helpful in addressing and resolving a particular customer service issue. Therefore, such a chat conversation may be featured more prominently in the chat conversation interface, as described in greater detail below.

In one example, the chat conversation interface may provide for an organizational representative to rate a chat conversation that has been reviewed. For instance, the organizational representative may be facing an issue relating to a service outage in zip code 77777. The organizational representative may select a term "77777" that is listed in the chat conversation interface, and may select one of the stored chat conversations related to 77777. If the organizational representative has found that the stored chat conversation was helpful in resolving the issue, the organizational representative may then give a higher rating to the stored chat conversation. However, if the chat conversation was not found to be helpful, or if the organizational representative deems that the chat conversation describes possible solutions that were not effective, the organizational representative may give a lower rating to the chat conversation, or may decline to provide a rating.

In one example, stored chat conversations may be presented in an order of ranking and/or based upon a number of times that the stored chat conversation has been referenced in subsequent chat conversations. Thus, for example, when an organizational representative clicks on a term that is presented in the chat conversation interface, a list of one or more stored chat conversations associated with the term may be presented. In one example, the most referenced chat conversations, the top rated chat conversations, and/or the most referenced and top rated chat conversations are presented first, or presented more prominently than those chat conversations with less references or lower ratings. As such, as different organizational representatives engage in serving various customer service issues, the different organizational representatives may discover commonalties among issues faced by other organizational representatives, with an increased likelihood that chat conversations deemed to be the most helpful in solving various issues can be found via the chat conversation interface.

In one example, a managerial or supervisory organizational representative may also utilize a chat conversation interface to engage with other organizational representatives in chat conversations, and to review tagged terms and the associated stored chat conversations. In one example, the managerial organizational representative may decide to create an advisory or a methods and procedures (M&P) solution (collectively referred to an "advisory" herein), to a customer service issue that is determined from the tagged terms and the associated chat conversations. For example, the managerial organizational representative may notice that the tagged terms "service outage" and "77777" are terms that are referenced in a number of chat conversations. For instance, the terms may be featured more prominently in a list of tagged terms, indicating that a relatively greater number of chat conversations include a tag of the term as compared to other terms. In addition, the managerial organizational representative may review one or more chat conversations associated with the terms "service outage" and "77777" and determine that there appears to be an issue affecting a cellular service for a number of subscribers in zip code 77777. The managerial organizational representative may then determine a status of efforts to resolve the problem, and create a template for customer service representatives to handle any future customer inquiries regarding service outages in zip code 77777. For instance, the current status may indicate that power to a nearby base station has been lost, and service technicians are working with the power company to restore power, with an estimate of one hour until service is fully restored. Thus, the managerial organizational representative may create an advisory with a script for informing a customer that the issue involves the power company, that the organization is working to solve the problem, and that the issue should be resolved shortly.

In one example, the chat conversation interface of the managerial organizational representative may enable the association of the advisory with one or more tagged terms. For example, the managerial organizational representative may upload the advisory via the chat conversation interface and identify one or more tagged terms to be associated with the advisory. Thereafter, other organizational representatives who select one of the terms associated with the advisory from a list of tagged terms may be presented with the advisory. In one example, chat conversations associated with a term covered by an advisory may still be presented. However, in another example, the advisory may be presented as a replacement for any stored chat conversations previously associated with the term. In one example, a chat conversation interface may present a separate window with available advisories. For instance, advisories may be presented in an order starting with the most recently issued, or may be presented in an order based upon most utilized. For instance, advisories reviewed by organizational representatives may also be ranked or rated, and the top rated advisories may be presented first or more prominently than advisories that are less frequently utilized, or deemed less relevant based upon the collective ratings of various organizational representatives. These and other aspects of the present disclosure are discussed in greater detail below in connection with the examples of FIGS. 1-5.

Figure 1:
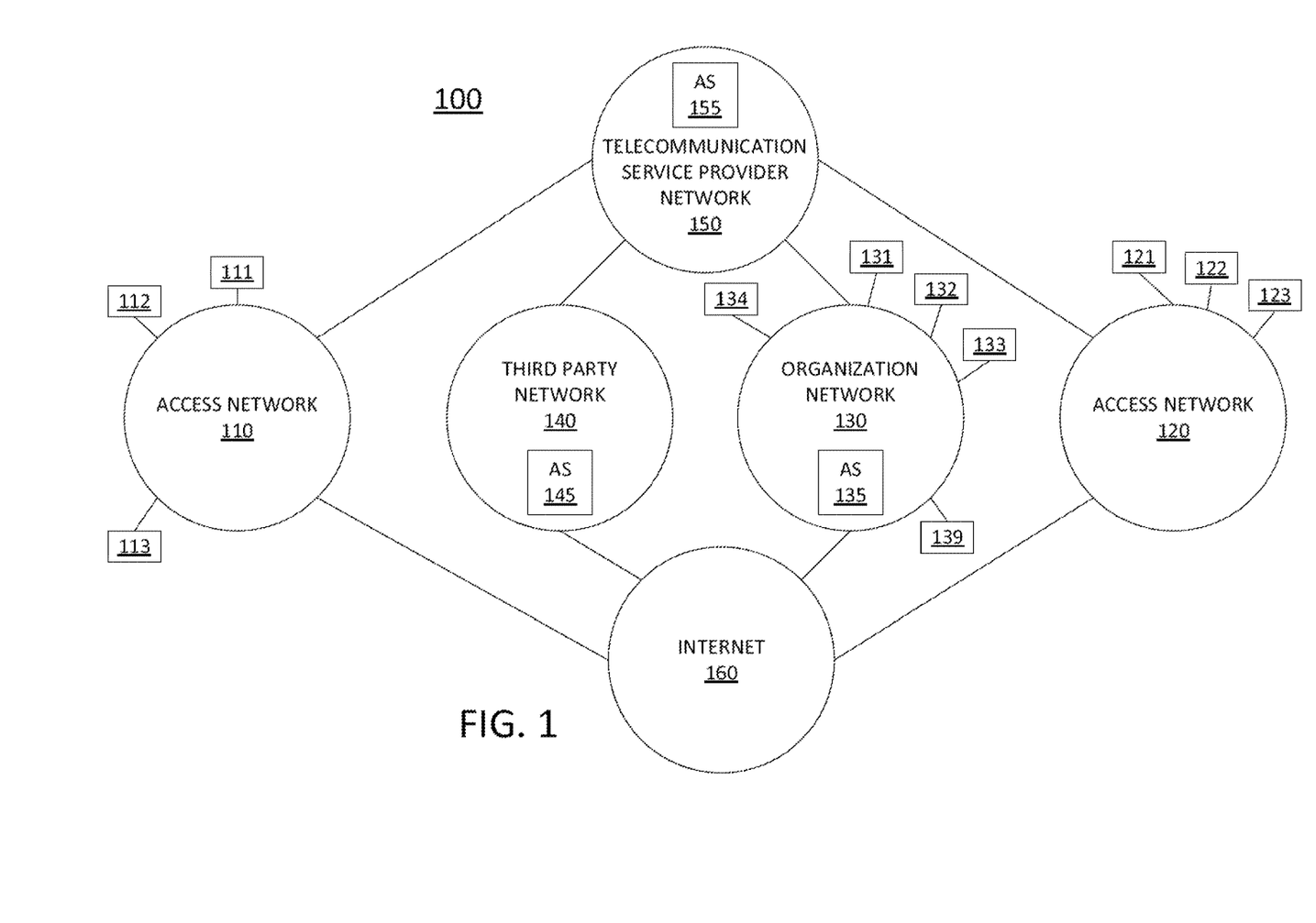
FIG. 1 illustrates one example of a system for customer service interactions, according to the present disclosure.

To aid in understanding the present disclosure, FIG. 1 illustrates an example system 100 comprising a plurality of different networks for supporting customer service interactions. Telecommunication service provider network 150 may comprise a core network with components for telephone services, Internet services, and/or television services (e.g., triple-play services, etc.) that are provided to subscribers, and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP)) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, 121-123, and telecommunication service provider network 150 relating to voice telephone calls, communications with web servers via the Internet 160 and/or other networks 130, 140, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of telecommunication service provider network 150. Endpoint devices 111-113 and 121-123 may each comprise a mobile device, a cellular smart phone, a laptop computer, a tablet computer, a desktop computer, a cluster of such devices, and the like. In one example, any one or more of endpoint devices 111-113 and 121-123 may comprise programs, logic or instructions for providing a customer service interaction chat conversation interface in accordance with the present disclosure.

In one example, the access networks 110 and 120 may be different types of access networks. In another example, the access networks 110 and 120 may be the same type of access network. In one example, one or more of the access networks 110 and 120 may be operated by the same or a different service provider from a service provider operating telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In one example, third party network 140 may comprise a local area network (LAN), or a distributed network connected through permanent virtual circuits (PVCs), virtual private networks (VPNs), and the like. In one example, third party network 140 may be operated by an entity that provides a service for associating chat conversations with tagged terms and for associating sets of procedural instructions with tagged terms, e.g., for customer service troubleshooting. In one example, third party network 140 may also include an application server (AS) 145. For example, the third party network 140 may provide a customer service interaction chat conversation service to one or more organizational customers. In one example, AS 145 may comprise a computing system, such as computing system 500 depicted in FIG. 5, and may be configured to provide one or more functions for providing a customer service interaction chat conversation service, in accordance with the present disclosure.

Similarly, organization network 130 may comprise a local area network (LAN), or a distributed network connected through permanent virtual circuits (PVCs), virtual private networks (VPNs), and the like. In one example, organization network 130 links one or more endpoint devices 131-134 and 139 with each other, the Internet 160, the telecommunication service provider network 150, and devices accessible via such other networks, such as endpoint devices 111-113 and 121-123, and so forth. In one example, endpoint devices 131-134, may comprise devices of organizational representatives, such as customer service representatives, or other employees or agents that address customer-facing issues on behalf of the organization that provides the organization network 130. In one example, endpoint device 139 may comprise a device of a manager, or any other type of supervisory employee or agent of the organization. In one example, endpoint devices 131-134 and 139 may each comprise a mobile device, a cellular smart phone, a laptop, a tablet computer, a desktop computer, a cluster of such devices, and the like. In one example, any one or more of endpoint devices 131-134 and 139 may comprise programs, logic or instructions for providing a customer service interaction chat conversation interface in accordance with the present disclosure.

In one example, organization network 130 may also include an application server (AS) 135. In one example, AS 135 may comprise a computing system, such as computing system 500 depicted in FIG. 5, and may be configured to provide one or more functions for providing a customer service interaction chat conversation service, in accordance with the present disclosure. In one example, telecommunication service provider network 150 may alternatively or additionally include an application server (AS) 155 for providing one or more functions for providing a customer service interaction chat conversation service, in accordance with the present disclosure. For example, the telecommunication service provider network 150 may provide a customer service interaction chat conversation service to one or more organizational customers/subscribers in addition to other telecommunication services. In one example, AS 155 may also comprise a computing system, such as computing system 500 depicted in FIG. 5. In one example, AS 155 may perform the same or substantially similar functions to those of AS 135 and/or AS 145. In one example, two or more of AS 135, AS 145, and AS 155 may cooperate to perform various aspects of the present disclosure in a distributed manner.

In one example, chat conversations between customers and organizational representatives, or between two or more organizational representatives may be facilitated via one or more of AS 135, AS 145, and AS 155. For instance, chat conversations messages may be passed between the devices of two or more users via AS 135, AS 145, and/or AS 155. In one example, AS 135, AS 145, and/or AS 155 may store completed chat conversations, e.g., within one or more data storage devices in the same network at a respective application server, or in one or more distributed data storage devices. For instance, in one example chat conversations may be stored in a cloud-based infrastructure utilized by AS 135, AS 145, and/or AS 155. In one example, a set of tagged terms may be stored in association with the chat conversations. In one example, ratings for various chat conversations may also be received and stored by AS 135, AS 145, and/or AS 155 in association with the stored chat conversations. In one example, AS 135, AS 145, and/or AS 155 may also present terms that have been tagged, and retrieve and present one or more stored chat conversations in response to a selection of a term and/or a selection of a chat conversation by a user via a chat conversation interface of the user's endpoint device. In one example, AS 135, AS 145, and/or AS 155 may also receive advisories related to one or more tagged terms and associate the advisories with the one or more tagged terms, e.g., based upon a selection by a managerial organizational representative via a chat conversation interface of the managerial organizational representative's endpoint device.

In one example, organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call via a telephone or engage in chat conversations via endpoint devices 111-113 and 121-123 with customer service representatives using endpoint devices 131-134. Example chat conversation interfaces are discussed in greater detail below in connection with FIG. 2.

In addition, it should be noted that the system 100 may be implemented in a different form than that illustrated in FIG. 1, or may be expanded by including additional endpoint devices, access networks, network elements, application servers, etc. without altering the scope of the present disclosure.

Figure 2:
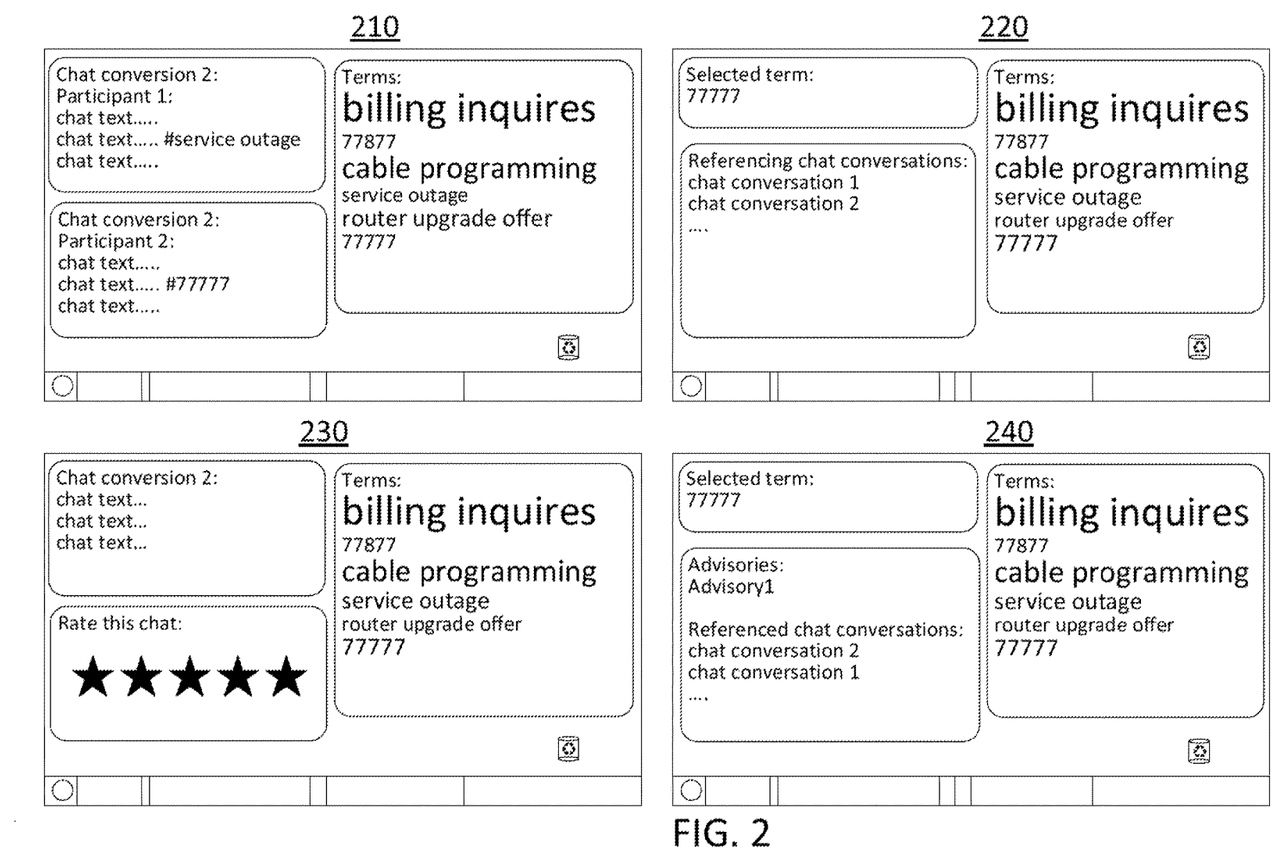
FIG. 2 illustrates an example chat conversation interface, according to the present disclosure.

To further aid in understanding the present disclosure, FIG. 2 illustrates several example display screens of a chat conversation interface, in accordance with the present disclosure. A first display screen 210 presents a chat conversation interface screen that may be presented on an endpoint device of a first organizational representative engaging in a chat conversation labeled "chat conversation 2." A first portion of the screen may display chat text that has been written and/or transmitted by a first participant, e.g., the first organization representative. A second portion of the screen may display chat text that has been written and/or transmitted by a second participant, e.g., another organizational representative who is conversing with the first participant regarding a customer service issue. In one example, the first participant may tag the term "service outage," as indicated by the hashtag "#" in FIG. 2. As also shown in display screen 210, the second participant has tagged the term "77777," e.g., a zip code. For instance, the first and second participants may be conversing regarding a potential service outage that may be related to zip code 77777. As shown on a third portion of display screen 210, a number of terms are presented in different size fonts. For example, the larger fonts may indicate that relatively more chat conversations have referenced (tagged) the term, as compared to other terms. Thus, "billing inquiries" appears to be the most tagged term, followed by "cable programming."

A second display screen 220 illustrates an example chat conversation interface screen after a term "77777" has been selected from a portion of the screen providing a number of terms for selection. In one example, a portion of the screen indicates that the term has been selected, while another portion of the screen lists chat conversations that have tagged the term. For instance, in display screen 220, referencing chat conversations include "chat conversation 1" and "chat conversation 2." In this example, "chat conversation 2" may be the same chat conversation that is illustrated in the first display screen 210. It should be noted that in the second display screen 220, the terms "service outage" and "77777" have increased in font size, while the term "router upgrade offer" has diminished in font size. For instance, the "chat conversation 2" includes tags of the terms "service outage" and "77777," thus respective counts of the number of chat conversations referencing these terms may be increased. Meanwhile, a router upgrade offer may have recently expired such that a number of chat conversations relating to the router upgrade offer may have declined. As such, the relative number of chat conversations tagging "router upgrade offer" may decline in comparison to the terms "service outage" and "77777," which have been tagged in the "chat conversation 2."

A third display screen 230 may illustrate an example chat conversation interface screen after "chat conversation 2" is selected via the chat conversation interface as illustrated in the second display screen 220. For example, a first portion of the third display screen 230 may present a transcript of the chat conversation that is selected. A second portion of the screen may provide a tool to select a rating for the chat conversation. In the example shown in the third display screen 230, the rating system is based on one to five stars. However, in other examples, various other types of rating systems, such as letter grading, a one to ten scale, and so forth, may be utilized.

A fourth display screen 240 may illustrate an example chat conversation interface screen when term "77777" has been selected, and after a managerial organizational representative has created an advisory, labeled "advisory1," and associated "advisory1" with at least the term "77777." In contrast to the second display screen 220, the fourth display screen 240 may present the "advisory1" first, after a selection of the term "77777." In one example, and as illustrated in the fourth display screen 240, chat conversations that have tagged the term are also presented for possible selection. However, in another example, where at least one advisory has been associated with a term, the selection of the term will result in the presentation of the advisory as an alternative to the display of the chat conversations that include tags of the term.

In the example of the fourth display screen 240, it should be noted that the order of "chat conversation 1" and "chat conversation 2" have changed as compared to the second display screen 200. For example, "chat conversation 2" may have received a high rating via the third display screen 230, such that the rating of "chat conversation 2" has become higher than the rating of "chat conversation 1." Therefore, "chat conversation 2" may be presented first, or may be presented more prominently as compared to "chat conversation 1."

It should be noted that the display screens of FIG. 2 are provided by way of example only. Thus, the present disclosure is not limited to a chat conversation interface as presented in FIG. 2, but may take a variety of forms suitable for use in connection with associating a chat conversation with a tagged term, for retrieving and rating chat conversations associated with tagged terms, for associating a set of procedural instructions with a tagged term, and so forth. In addition, it should be noted that some chat conversations in accordance with the present disclosure may comprise chat conversations between a customer service representative and a customer, e.g., in contrast to a chat conversation between two or more organizational representatives. In one example, the customer may be provided with a chat conversation interface. However, the functionality of the chat conversation interface for the customer may be limited. For instance, the customer may be limited to viewing the current chat conversation between the customer and a customer service representative. In one example, the customer may also be enabled to tag terms within the chat conversation. However, the customer may not be provided with a set of one or more tagged terms that have been tagged in previous chat conversations. In addition, the customer may be prevented from selecting and viewing previous chat conversations. In another example, the chat conversation interface may present a different display screen for a managerial organizational representative. For example, additional menus, and links may be presented on a display screen of a managerial organizational representative that are not available to other organizational representatives.

Figure 3:
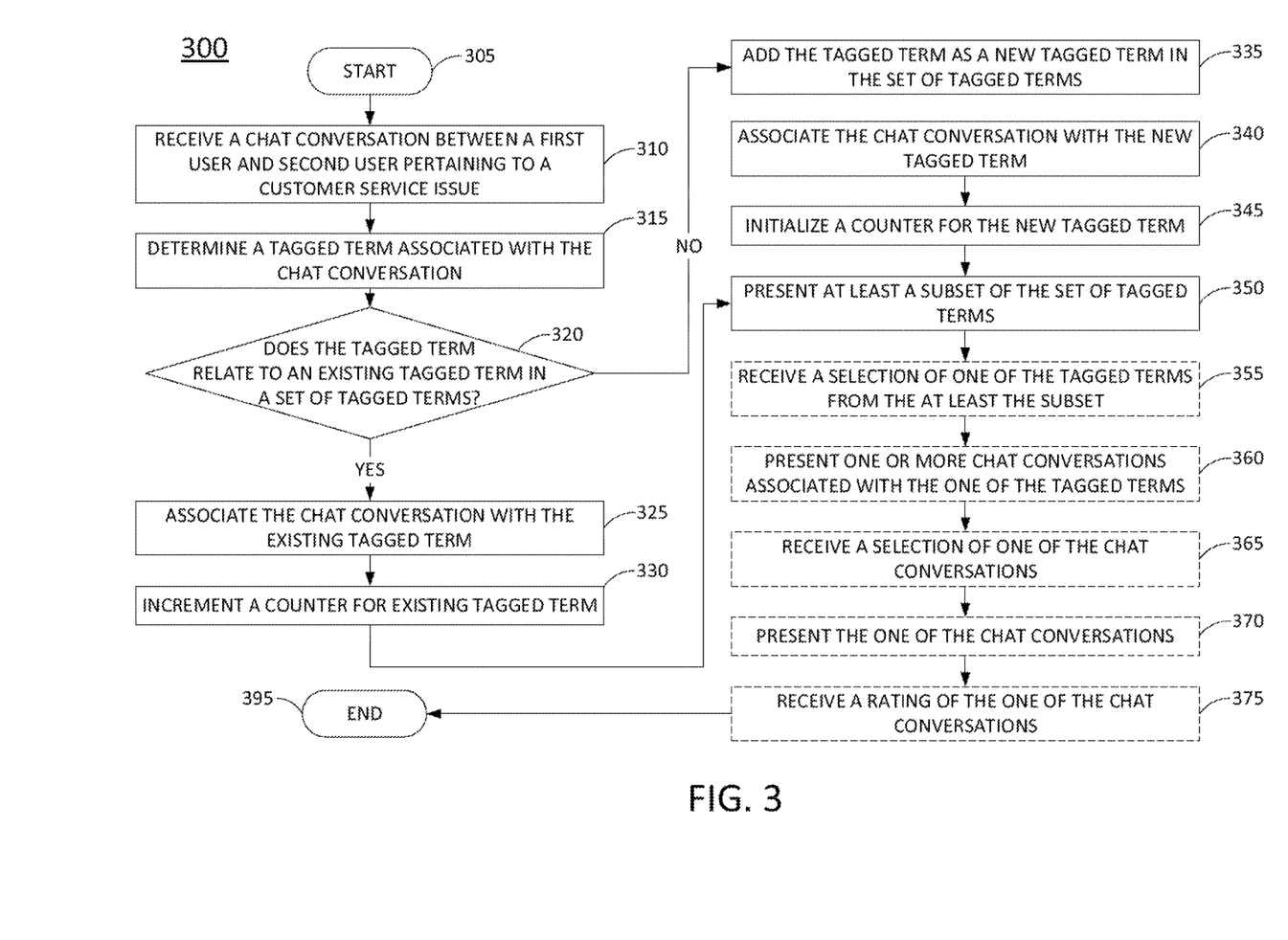
FIG. 3 illustrates an example flowchart of a method for associating a chat conversation with a tagged term.

FIG. 3 illustrates an example flowchart of a method 300 for associating a chat conversation with a tagged term. In one example, the steps, operations or functions of the method 300 may be performed by any one or more of the components of the system 100 depicted in FIG. 1. For instance, in one example, the method 300 is performed by the application server 135. In another example, the method 300 is performed by the application server 145 or application server 155. In another example, the method 300 may be performed by two or more of application servers 135, 145, and 155 in a parallel and/or distributed manner. Alternatively, or in addition, one or more steps, operations or functions of the method 300 may be implemented by a computing device having a processor, a memory and input/output devices as illustrated below in FIG. 5, specifically programmed to perform the steps, functions and/or operations of the method. Although any one of the elements in system 100 may be configured to perform various steps, operations or functions of the method 300, the method will now be described in terms of an example where steps of the method are performed by a processor, such as processor 502 in FIG. 5.

The method 300 begins at step 305 and proceeds to step 310. At step 310, the processor receives a chat conversation between a first user and a second user pertaining to a customer service issue. For example, the first user may comprise a customer while the second user may comprise an organizational representative, e.g., a customer service representative. In another example, the first and second users may comprise organizational representatives, e.g., customer service representatives, service technicians, and so forth. In one example, the chat conversations may comprise a series of one or more messages pertaining to a customer service issue. In one example, one or more of the users participating in the chat conversation may tag a term in one of the messages in order to associate the chat conversation with the term.

At step 315, the processor determines a tagged term associated with the chat conversation. For example, as mentioned above, one or more of the users participating in the chat conversation may include a tag that identifies a particular term. For example, a hashtag or another tag identifier may indicate to the processor that a following term, a preceding term, a term contained between tags, and so forth should be identified with the chat conversation.

At step 320, the processor determines whether the tagged term relates to an existing tagged term in a set of tagged terms. For example, the processor may store a list or other set of tagged terms that have been used in previous chat conversations. When the tagged term relates to an existing tagged term in the set, the method 300 then proceeds to step 325. Otherwise the method 300 proceeds to step 335.

At step 325, the processor associates the chat conversation with the existing tagged term. For example, users of a chat conversation interface may view and select terms that have been tagged in previous chat conversations. A user may also be presented with one or more of the previous chat conversations that have tagged the term in response to a selection of the term by the user. Thus, the processor may link the chat conversation to the tagged term such that it may be presented upon the selection of the term by one of the users.

At step 330, the processor increments a counter for the tagged term. For example, since the chat conversation has tagged a term that has already been tagged in one or more previous chat conversations, the processor may increase the counter for the tagged term, e.g., by an increment of one. As mentioned above, in one example, users of a chat conversation interface may be presented with terms that have been tagged in previous chat conversations. In addition, in one example, terms that have been tagged more times may be presented higher in a list, or may be displayed more prominently as compared to terms that have been tagged in fewer chat conversations. Thus, the use of counters enables the processor to distinguish the terms that have been tagged more frequently from those terms that have been tagged less frequently. Following step 330, the method 300 proceeds to step 350.

As mentioned above, when the tagged term is determined at step 320 as not being related to an existing tagged term in the set of tagged terms, the method 300 proceeds from step 320 to step 335. At step 335, the processor adds the tagged term as a new term in the set of tagged terms.

At step 340, the processor associates the chat conversation with the new tagged term in the set of tagged terms. For example, the present disclosure makes the chat conversation available to subsequent users, e.g., organizational representatives, who may face similar issues to those evidenced by the chat conversation. In addition, to assist subsequent users in discovering prior chat conversations that may be helpful, the other users may be presented with various tagged terms that can be selected to find associated chat conversations.

At step 345, the processor initializes a counter for the new tagged term. For instance, the counter may enable the processor to determine the relative importance of the tagged term as compared to other tagged terms, in order to prioritize a presentation of tagged terms via a chat conversation interface.

At step 350, the processor presents at least a subset of the set of tagged terms, e.g., via a chat conversation interface. As mentioned, the processor may prioritize a presentation of one tagged term versus another tagged term based upon counters of the number of chat conversations in which the respective tagged terms have been tagged. In various examples, the top 10, top 20, or some other number of tagged terms from a larger set of tagged terms may be presented via the chat conversation interface. Thus, as mentioned above, to assist subsequent users in discovering prior chat conversations that may be helpful, the other users may be presented with various tagged terms that can be selected to find associated chat conversations. In one example, the tagged terms may be presented in a particular order based upon the relative counts, may be presented in different size fonts, or may use another type of signal (e.g., color of the displayed tagged term) to identify the relative levels of tagging of the respective tagged terms.

Following step 350, the method 300 may proceed to optional step 355 or may proceed to step 395 where the method ends.

At optional step 355, the processor may receive a selection of the one of the tagged terms from at least the subset of tagged terms. For example, a user may click on one of the tagged terms that are presented via a chat conversation interface. In one example, the user may comprise a third user who is different from the first user and the second user who were participants in the chat conversation received at step 310.

At optional step 360, the processor presents one or more chat conversations associated with the selected tagged term. For example, chat conversations may be ranked based upon a number of chat conversations that subsequently cite to the chat conversation and/or based upon a ranking of the chat conversation. For instance, other users may be provided with a tool to rate or rank any chat conversations that the other users may have reviewed. In one example, one or more other users who are different from the first, second, and third users may have provided ratings of the chat conversation. Thus, chat conversations that are deemed most helpful in resolving particular customer service issues associated with the chat conversations and tagged terms should received higher ratings than chat conversations that are deemed less relevant or less helpful. As such, the presentation of chat conversations may be prioritized to emphasize those chat conversations that are more likely to be found useful, e.g., those with more citations and/or higher ratings.

At optional step 365, the processor receives a selection of one of the chat conversations. For example, the third user may select one of the chat conversations that are offered for selection. For instance, the third user may click on a link or an identifier of a chat conversation in order to make the selection.

At optional step 370, the processor presents one of the chat conversations that is selected. For instance, in response to a selection of a particular chat conversation received at step 365, the processor may retrieve and present a transcript of the selected chat conversation via a chat conversation interface on an endpoint device of the third user providing the selection at step 365.

At optional step 375, the processor receives a rating for one of the chat conversations. For example, the processor may present a tool for the third user to select a rating for the chat conversation via a chat conversation interface on the third user's endpoint device. Thus, the third user may enter a rating that may be received by the processor at step 375. The rating may be associated with the chat conversation such that the processor may later prioritize a display order of chat conversations in response to a selection of a tagged term by a subsequent user. For example, if the third user found the chat conversations to be particularly helpful, the third user may give the chat conversation a high rating. Thus, another user selecting a tagged term that may have been tagged in the chat conversation may encounter the chat conversation being displayed higher on a list, or displayed more prominently due to the increased ranking of the chat conversation caused by the prior user's rating received at step 375. Following step 375, the method 300 proceeds to step 395 where the method ends.

Figure 4:
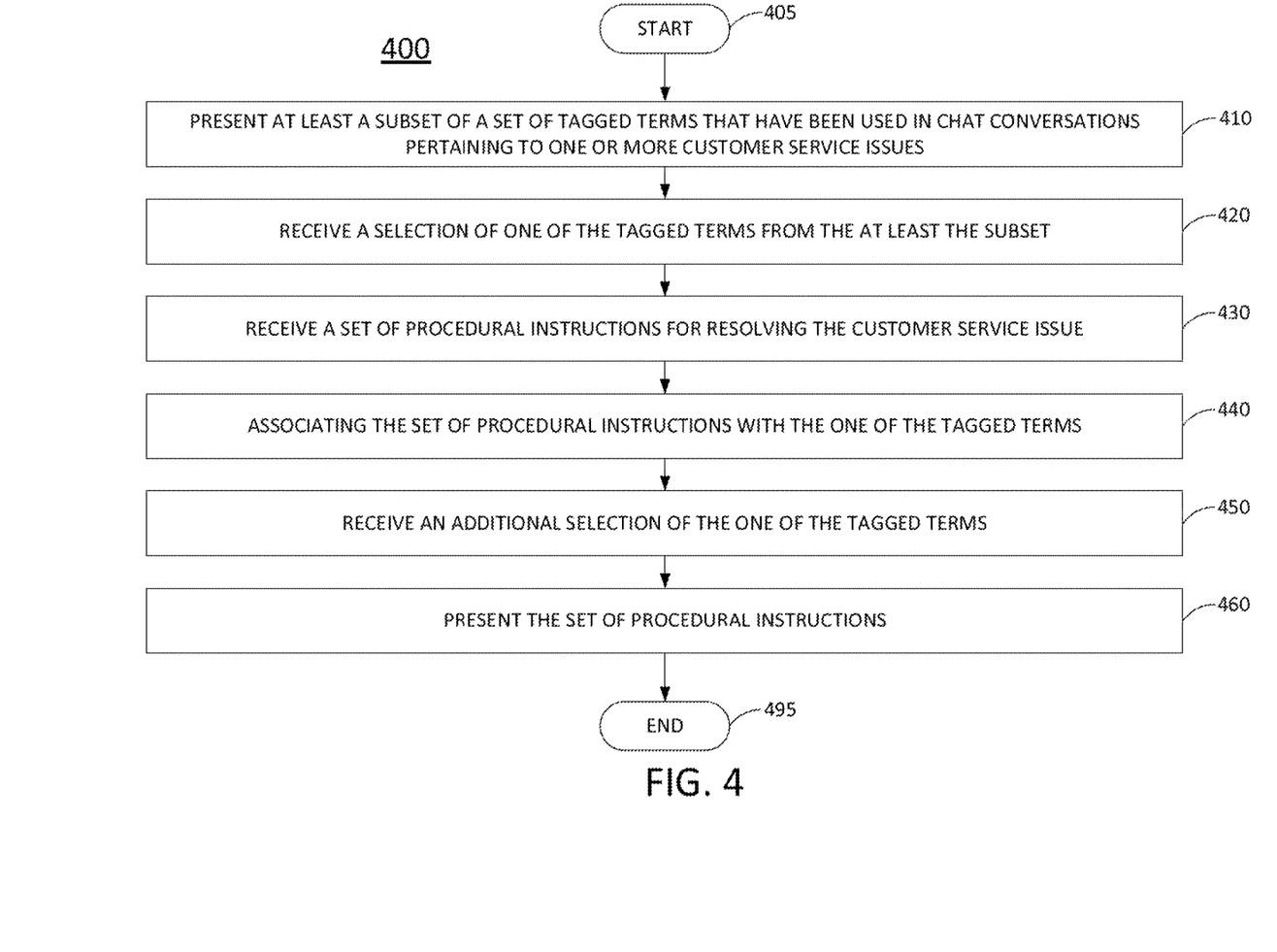
FIG. 4 illustrates an example flowchart of a method for associating a set of procedural instructions with a tagged term.

FIG. 4 illustrates an example flowchart of a method 400 for associating a set of procedural instructions with a tagged term. In one example, the steps, operations or functions of the method 400 may be performed by any one or more of the components of the system 100 depicted in FIG. 1. For instance, in one example, the method 400 is performed by the application server 135. In another example, the method 400 is performed by the application server 145 or application server 155. In another example, the method 400 may be performed by two or more of application servers 135, 145, and 155 in a parallel and/or distributed manner. Alternatively, or in addition, one or more steps, operations or functions of the method 400 may be implemented by a computing device having a processor, a memory and input/output devices as illustrated below in FIG. 5, specifically programmed to perform the steps, functions and/or operations of the method. Although any one of the elements in system 100 may be configured to perform various steps, operations or functions of the method 400, the method will now be described in terms of an example where steps of the method are performed by a processor, such as processor 502 in FIG. 5.

The method 400 begins at step 405 and proceeds to step 410. At step 410, the processor presents at least a subset of a set of tagged terms that have been used in chat conversations pertaining to one or more customer service issues. For example, step 410 may comprise the same or similar operations to those discussed above in connection with step 350 of the method 300.

In step 420, the processor receives a selection of one of the tagged terms from the subset of tagged terms. For example, step 420 may comprise the same or similar operations to those discussed above in connection with optional step 355 of the method 300. In one example, the processor may present for selection one or more chat conversations that are associated with the tagged term that is selected. For example, the term may be selected by a managerial organizational representative to investigate which issues may be affecting the organization. In addition, the managerial organizational representative may wish to review chat conversation transcripts that appear to relate to solutions to one or more of such issues.

In step 430, the processor receives a set of procedural instructions for resolving the customer service issue. For example, the managerial organizational representative may notice a common issue that is being faced by other organizational representatives and may desire to create a streamlined advisory or methods and procedures (M&P), broadly, a "set of procedural instructions," for handling the issue. For instance, the set of procedural instructions may comprise a script for customer service representatives to follow when fielding calls or interacting via chat conversations with customers pertaining to the customer service issue. In another example, the customer service issue may comprise a problem that affects a particular device model used by a large number of subscribers. Thus, the set of procedural instructions may comprise a guide for service technicians to update subscriber devices to protect against the problem.

In step 440, the processor associates the set of procedural instructions with the one of the tagged terms. For instance, the set of procedural instructions may be associated with a tagged term "router exploit." Thus, organizational representatives that select the tagged term "router exploit" via a chat conversation interface may be presented with the set of procedural instructions associated with the term "router exploit." The set of procedural instructions may also be associated with multiple tagged terms. For instance the managerial organizational representative may also indicate that the set of procedural instructions should also be associated with the tagged term "zero-day" or a tagged term comprising a router model name and/or a router model number.

In step 450, the processor receives an additional selection of the one of the tagged terms. For example, another organizational representative may select the one of the tagged terms that is presented via a chat conversation interface. In one example, step 450 may comprise the same or similar operations to those discussed above in connection with step 420, or in connection with optional step 355 of the method 300.

In step 460, the processor presents the set of procedural instructions. For example, as mentioned above, for any tagged term that has a set of procedural instructions associated therewith, the processor may cause the set of procedural instructions to be presented via a chat conversation interface in response to a selection of the tagged term. The presentation of the set of procedural instructions may be as an alternative or in addition to any stored chat conversations that are also associated with the tagged term. Following step 460, the method 400 proceeds to step 495 where the method ends.

In addition, although not specifically specified, one or more steps, functions or operations of the methods 300 and 400 may include a storing, displaying and/or outputting step as required for a particular application. In other words, any data, records, fields, and/or intermediate results discussed in the respective methods 300 and 400 can be stored, displayed and/or outputted either on the device executing the method 300 and/or the method 400, or to another device, as required for a particular application.

Furthermore, steps, blocks, functions, or operations in FIGS. 3 and 4 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 300 or 400 may comprise optional steps, or can be combined, separated, and/or performed in a different order from that described above, without departing from the examples of the present disclosure. The use of the term "optional" in the above disclosure does not mean that any other steps not labeled as "optional" are not optional. It should also be noted that although the methods 300 and 400 are described as separate processes, in one example, methods 300 and 400 may be performed in connection with one another and/or at the same time. For instance, in one example the method 400 may be performed following step 350 of the method 300.

As such, the present disclosure provides at least one advancement in the technical field of customer service interaction data management and user interface optimization. This advancement is in addition to the traditional methods of customer service representatives fielding calls from customers, placing calls to other employees to find answers to questions, and relaying information back to customers. In particular, the present disclosure provides a chat conversation interface via endpoint devices, allows organizational representatives and customers to tag terms in chat conversations, stores chat conversations in association with tagged terms, prioritizes tagged terms based upon a level of usage, and prioritizes chat conversations based upon a rating and/or level of referencing. This leads to more efficient customer service interactions, greater customer satisfaction, faster troubleshooting of issues that affect customers, and better and more efficient use of human resources within an organization. In particular, less time is wasted with organizational representatives potentially duplicating the discovery of solutions to customer service issues that may have already been addressed by others.

The present disclosure also provides a transformation of data, e.g., chat conversations are generated, stored and analyzed, and are transformed into additional data or new data that characterizes tagged terms within the chat conversations, ranks tagged terms based upon a number of chat conversations that have tagged the tagged terms, ranks chat conversations that are stored in association with the tagged terms, and ranks procedural instructions that are stored in association with the tagged terms.

Finally, examples of the present disclosure improve the functioning of a computing device, e.g., a server. Namely, a server for customer service interactions is improved by the use of a chat conversation interface service, thereby providing a more robust process for handing customer service issues by customer service representatives or other organizational representatives.

Figure 5:
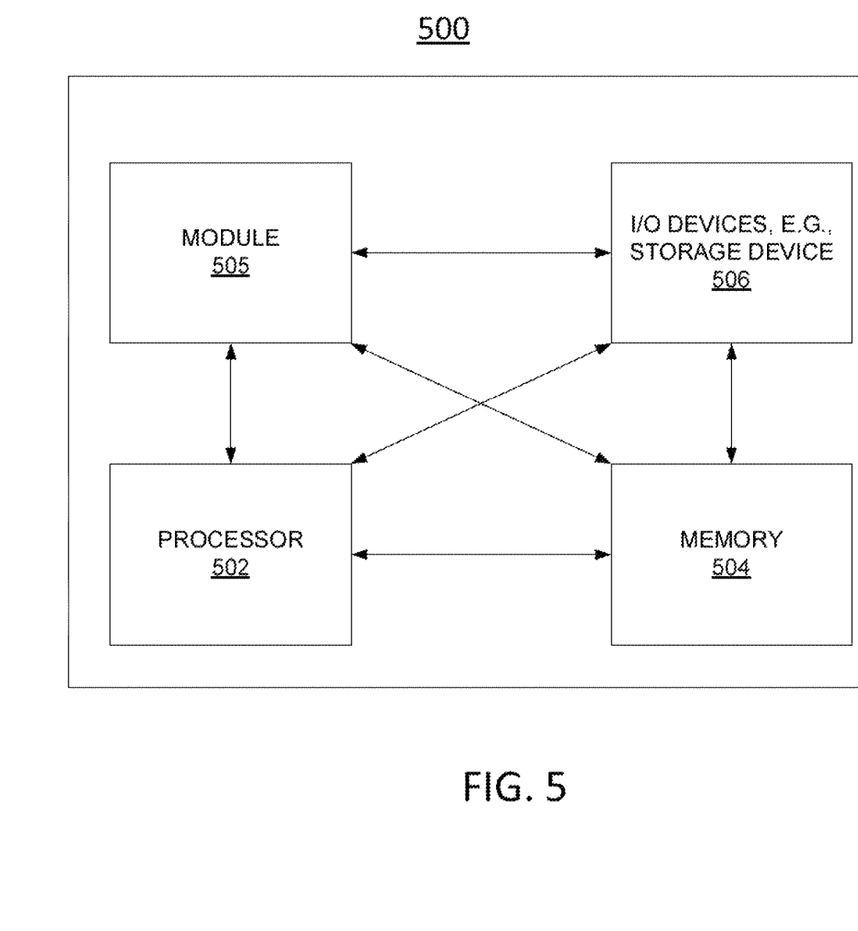
FIG. 5 illustrates a high-level block diagram of a computing device specially programmed for use in performing the functions described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for associating a chat conversation with a tagged term or for associating a set of procedural instructions with a tagged term, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 or the method 400 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 502 can also be configured or programmed to cause other devices to perform one or more operations as discussed above. In other words, the one or more hardware processors 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 505 for associating a chat conversation with a tagged term or for associating a set of procedural instructions with a tagged term (e.g., a software program comprising computer-executable instructions) can be loaded into memory 504 and executed by hardware processor element 502 to implement the steps, functions or operations as discussed above in connection with the illustrative methods 300 and 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for associating a chat conversation with a tagged term or for associating a set of procedural instructions with a tagged term (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method, comprising:
   receiving, by a processor, a chat conversation between a first user and a second user, wherein the chat conversation pertains to a customer service issue of a customer of a business organization, wherein the first user and the second user comprise organizational representatives of the business organization;
   determining, by the processor, in response to the receiving the chat conversation, a tagged term associated with the chat conversation, wherein the tagged term is determined based upon a tag indicator in the chat conversation, wherein the tagged term in the chat conversation is tagged by one of: the first user or the second user, wherein the tagged term identifies the customer service issue to which the chat conversation pertains;
   determining, by the processor, in response to the determining the tagged term associated with the chat conversation, whether the tagged term in the chat conversation relates to an existing tagged term in a set of tagged terms;
   when the tagged term in the chat conversation relates to the existing tagged term in the set of tagged terms:
      associating, by the processor, the chat conversation with the existing tagged term in the set of tagged terms by establishing a link between the chat conversation and the existing tagged term in the set of tagged terms such that the chat conversation is presented upon a selection of the existing tagged term; and
      incrementing, by the processor, a counter for the existing tagged term in the set of tagged terms; and
   when the tagged term in the chat conversation does not relate to any tagged term in the set of tagged terms:
      adding, by the processor, the tagged term in the chat conversation as a new tagged term in the set of tagged terms;
      associating, by the processor, the chat conversation with the new tagged term in the set of tagged terms by establishing a link between the chat conversation and the new tagged term in the set of tagged terms such that the chat conversation is presented upon a selection of the new tagged term; and
      initializing, by the processor, a counter for the new tagged term in the set of tagged terms; and
   presenting, by the processor, at least a subset of the set of tagged terms, wherein the at least the subset of the set of tagged terms comprises a predetermined number of tagged terms of the set of tagged terms that have been tagged more times as compared to other tagged terms of the set of tagged terms based on a value of a respective counter for each of the tagged terms of the set of tagged terms.

2. The method of claim 1, wherein the presenting comprises:
   presenting the at least the subset of the set of tagged terms to a device of a third user.

3. The method of claim 2, wherein the third user comprises a managerial organizational representative.

4. The method of claim 2, further comprising:
   receiving, from the device of the third user, a selection of one of the tagged terms from the at least the subset of the set of tagged terms.

5. The method of claim 4, further comprising:
   presenting, to the device of the third user, a set of chat conversations associated with the one of the tagged terms.

6. The method of claim 5, wherein the presenting the set of chat conversations comprises presenting the set of chat conversations in an order based upon a respective rating of each chat conversation of the set of chat conversations.

7. The method of claim 6, wherein the respective rating of the each chat conversation of the set of chat conversations is based upon ratings from one or more other users who are different from the first user, the second user, and the third user.

8. The method of claim 5, further comprising:
receiving, from the device of the third user, a selection of one of the chat conversations from the set of chat conversations;
presenting, to the device of the third user, the one of the chat conversations; and
receiving, from the device of the third user, a rating of the one of the chat conversations.

9. The method of claim 8, wherein the rating of the one of the chat conversations pertains to a utility of the one of the chat conversations in resolving the customer service issue.

10. The method of claim 4, further comprising:
receiving a set of procedural instructions for resolving the customer service issue; and
associating the set of procedural instructions with the one of the tagged terms that is selected from the at least the subset of the set of tagged terms.

11. The method of claim 10, further comprising:
receiving an additional selection of the one of the tagged terms from the at least the subset of the set of tagged terms, wherein the additional selection is received from a device of a fourth user; and
presenting, to the device of the fourth user, the set of procedural instructions for resolving the customer service issue.

12. The method of claim 1, wherein the chat conversation comprises a plurality of messages between the first user and the second user.

13. The method of claim 1, wherein the tag indicator comprises a hashtag.

14. The method of claim 1, wherein the tagged term comprises a word or a phrase in the chat conversation.

15. A device, comprising:
a processor; and
a non-transitory computer-readable medium storing instructions which, when executed by the processor, cause the processor to perform operations, the operations comprising:
receiving a chat conversation between a first user and a second user, wherein the chat conversation pertains to a customer service issue of a customer of a business organization, wherein the first user and the second user comprise organizational representatives of the business organization;
determining, in response to the receiving the chat conversation, a tagged term associated with the chat conversation, wherein the tagged term is determined based upon a tag indicator in the chat conversation, wherein the tagged term in the chat conversation is tagged by one of: the first user or the second user, wherein the tagged term identifies the customer service issue to which the chat conversation pertains;
determining, in response to the determining the tagged term associated with the chat conversation, whether the tagged term in the chat conversation relates to an existing tagged term in a set of tagged terms;
when the tagged term in the chat conversation relates to the existing tagged term in the set of tagged terms:
associating the chat conversation with the existing tagged term in the set of tagged terms by establishing a link between the chat conversation and the existing tagged term in the set of tagged terms such that the chat conversation is presented upon a selection of the existing tagged term; and
incrementing a counter for the existing tagged term in the set of tagged terms; and
when the tagged term in the chat conversation does not relate to any tagged term in the set of tagged terms:
adding the tagged term in the chat conversation as a new tagged term in the set of tagged terms;
associating the chat conversation with the new tagged term in the set of tagged terms by establishing a link between the chat conversation and the new tagged term in the set of tagged terms such that the chat conversation is presented upon a selection of the new tagged term; and
initializing a counter for the new tagged term in the set of tagged terms; and
presenting at least a subset of the set of tagged terms, wherein the at least the subset of the set of tagged terms comprises a predetermined number of tagged terms of the set of tagged terms that have been tagged more times as compared to other tagged terms of the set of tagged terms based on a value of a respective counter for each of the tagged terms of the set of tagged terms.

16. The device of claim 15, wherein the presenting comprises:
presenting the at least the subset of the set of tagged terms to a device of a third user.

17. The device of claim 16, wherein the third user comprises a managerial organizational representative.

18. The device of claim 16, wherein the operations further comprise:
receiving, from the device of the third user, a selection of one of the tagged terms from the at least the subset of the set of tagged terms.

19. The device of claim 18, wherein the operations further comprise:
presenting, to the device of the third user, a set of chat conversations associated with the one of the tagged terms.

20. A non-transitory computer-readable medium storing instructions which, when executed by the processor, cause the processor to perform operations, the operations comprising:
receiving a chat conversation between a first user and a second user, wherein the chat conversation pertains to a customer service issue of a customer of a business organization, wherein the first user and the second user comprise organizational representatives of the business organization;
determining, in response to the receiving the chat conversation, a tagged term associated with the chat conversation, wherein the tagged term is determined based upon a tag indicator in the chat conversation, wherein the tagged term in the chat conversation is tagged by one of: the first user or the second user, wherein the tagged term identifies the customer service issue to which the chat conversation pertains;
determining, in response to the determining the tagged term associated with the chat conversation, whether the tagged term in the chat conversation relates to an existing tagged term in a set of tagged terms;
when the tagged term in the chat conversation relates to the existing tagged term in the set of tagged terms:
associating the chat conversation with the existing tagged term in the set of tagged terms by establishing a link between the chat conversation and the existing tagged term in the set of tagged terms such that the chat conversation is presented upon a selection of the existing tagged term; and
incrementing a counter for the existing tagged term in the set of tagged terms; and when the tagged term in the chat conversation does not relate to any tagged term in the set of tagged terms:
adding the tagged term in the chat conversation as a new tagged term in the set of tagged terms;
associating the chat conversation with the new tagged term in the set of tagged terms by establishing a link between the chat conversation and the new tagged term in the set of tagged terms such that the chat conversation is presented upon a selection of the new tagged term; and
initializing a counter for the new tagged term in the set of tagged terms; and presenting at least a subset of the set of tagged terms, wherein the at least the subset of the set of tagged terms comprises a predetermined number of tagged terms of the set of tagged terms that have been tagged more times as compared to other tagged terms of the set of tagged terms based on a value of a respective counter for each of the tagged terms of the set of tagged terms.

\* \* \* \* \*